Figure 2:
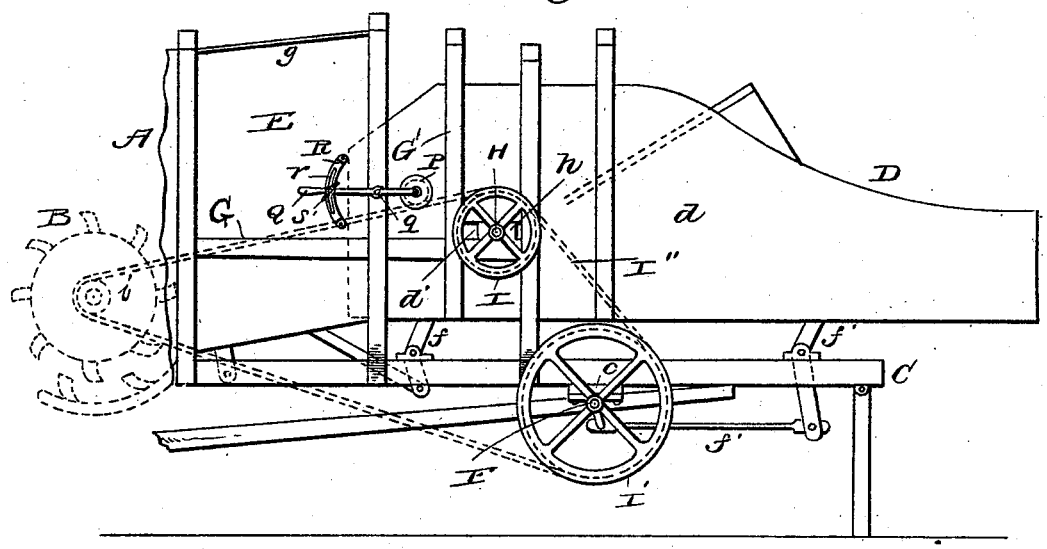

(No Model.) 2 Sheets—Sheet 1.
R. L. COOLEY.
BAND CUTTING ATTACHMENT FOR THRASHING MACHINES.
No. 529,601. Patented Nov. 20, 1894.
Fig. 1.
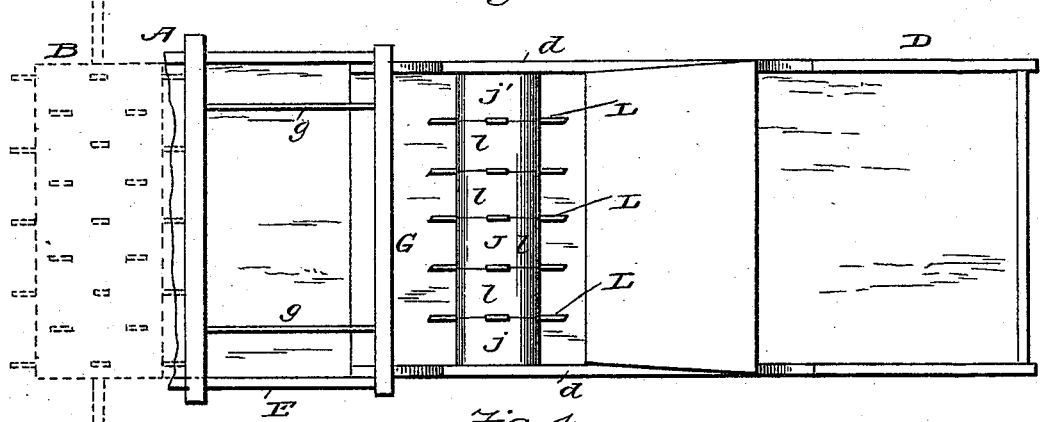
Fig. 4.
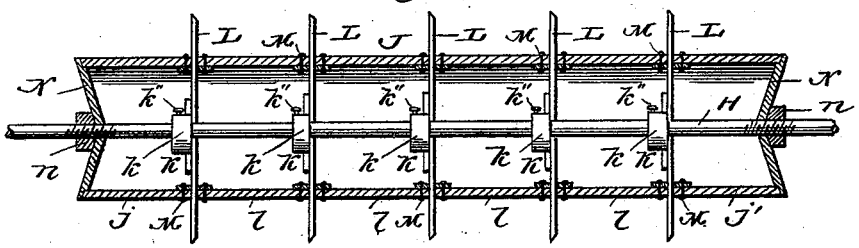
Fig. 5.
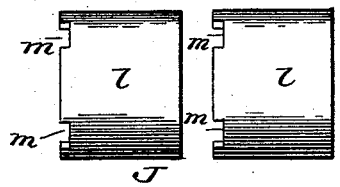
Fig. 6.
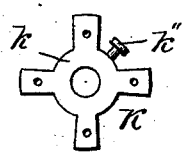
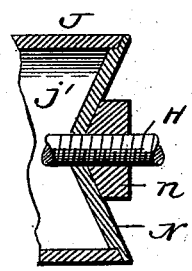
Fig. 9.
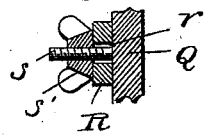
Fig. 7.
Witnesses:
Wm. C. Dashiell
Wm. H. Edwards
Fig. 8.
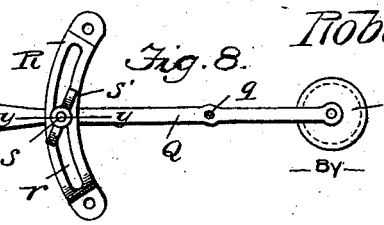
Robert L. Cooley, Inventor.
By Edwin Orr, Attorneys (No Model.) 2 Sheets—Sheet 2.

R. L. COOLEY.
BAND CUTTING ATTACHMENT FOR THRASHING MACHINES.

No. 529,601. Patented Nov. 20, 1894.

Witnesses:
Wm C Dashiell
Wm H Edwards

Inventor.
Robert L. Cooley.
By Edson Bros
Attorneys

UNITED STATES PATENT OFFICE.

ROBERT L. COOLEY, OF ABILENE, KANSAS, ASSIGNOR OF ONE-HALF TO JOHN T. PRENDERGAST, OF SAME PLACE.

BAND-CUTTING ATTACHMENT FOR THRASHING-MACHINES.

SPECIFICATION forming part of Letters Patent No. 529,601, dated November 20, 1894.

Application filed April 23, 1894. Serial No. 508,672. (No model.)

*To all whom it may concern:*

Be it known that I, ROBERT L. COOLEY, a citizen of the United States, residing at Abilene, in the county of Dickinson and State of Kansas, have invented certain new and useful Improvements in Band-Cutting Attachments for Thrashing-Machines; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention is a band cutting attachment for thrashing machines, more especially designed for use in connection with the automatic feeder for thrashing machines for which I made application for Letters Patent on the 19th day of February, 1894, Serial No. 500,758, and the objects of the improvements are, first, to so combine the band cutting mechanism with the feeder as to enable it to be used in connection with the motor appliances of the feeder which are operated by connections with the cylinder-shaft of the machine, and, secondly, to provide a novel form of cutter cylinder which can be taken apart to permit the knives to be removed, sharpened and replaced with ease and facility.

To the accomplishment of these ends, the invention consists in the combination with a frame attached to the primary-machine frame, and a reciprocating feed-shaker provided with longitudinal slots to accommodate the shaft of the cutter cylinder, of a cutter cylinder situated within the shaker of the feed mechanism and having its shaft passing through the slots in said shaker and journaled in bearings on the frame provided therefor, connections between the cutter-cylinder shaft, the crank shaft of the feed shaker, and the cylinder shaft of the primary machine, and an inclined deflector board attached to the feed shaker and extending upward and forward from the band cutter, to prevent the sheaf from feeding over the band cutter and cause the shock to pass along the bottom of the feed-shaker and be properly presented to the knives on the band cutter cylinder.

The invention further consists in the novel construction of the band cutter cylinder comprising a longitudinal shaft, a series of spiders fixed at suitable intervals to the shaft and each having a series of curved knives attached thereto and projecting outward beyond the shaft, a cylinder composed of a series of tubular sections fitted concentric with the shaft between the knives of the cutter so as to alternate therewith and the sections provided with notches to receive the knives of the cutter and cause the edges of the sections to abut or bear against one another, attaching devices for connecting the sections of the cylinder together between the knives, and suitable heads or collars clamped to the longitudinal shaft and bearing against the end sections of the cylinder to hold the cylinder sections in fixed relation to each other and to the knives of the series of spiders on the shaft.

To enable others to more readily understand my improvements, I have illustrated the preferred embodiment thereof in the accompanying drawings, forming a part of this specification, and in which—

Figure 3:
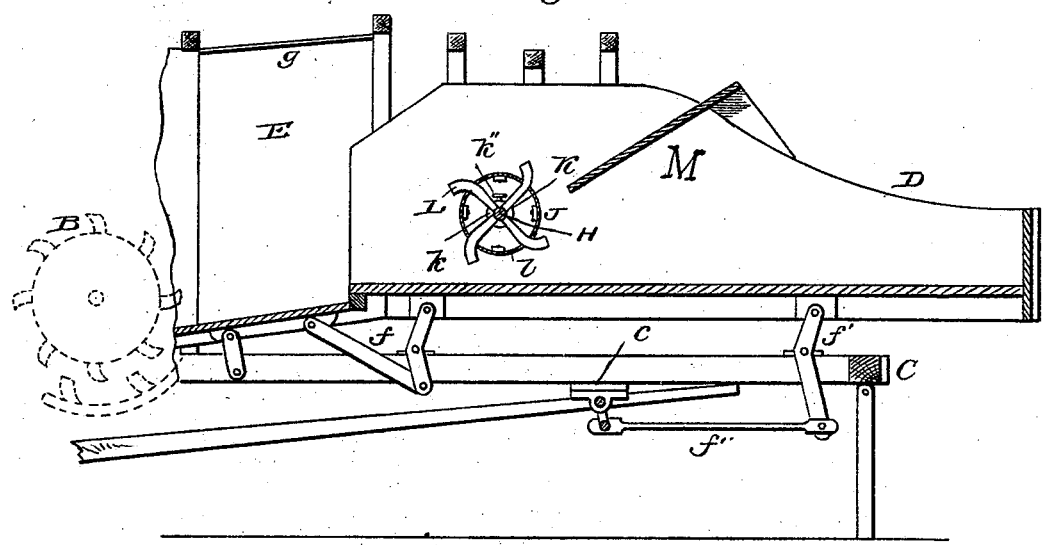

Figure 1 is a plan view of the band cutter as applied to the feeder shown in my prior application. Fig. 2 is a side elevation thereof. Fig. 3 is a longitudinal sectional view of the same. Fig. 4 is a longitudinal sectional view of the cutter cylinder on an enlarged scale. Figs. 5, 6, and 7 are detail views of parts of the band cutter cylinder shown by Fig. 4. Figs. 8 and 9 are detail views of the belt tightener.

Like letters of reference denote corresponding parts in all the figures of the drawings, referring to which—

A designates the frame or casing of the primary machine and B is the cylinder thereof. From this frame, A, extends the horizontal frame C on which is pivotally supported the primary shaker, D, and the auxiliary shaker E of the feed mechanism shown in my prior application; said horizontal frame C also supporting the bearings *c* in which is journaled the crank shaft, F, which has link connections, *f, f'* with the main and auxiliary shakers of the feeder, all of which will more fully appear by reference to the prior application hereinbefore referred to.

To the main frame or casing, A, of the primary machine is attached the inner end of another horizontal frame, G, which lies above and parallel to the horizontal frame C on which the feeder is supported, and the outer end of this upper horizontal frame, G, is attached to and braced by the uprights or standards, G' which extend above the primary shaker D and are joined together by the tie bar g. See Fig. 2. On this upper horizontal frame are supported the bearings h, in which is journaled the shaft, H, of the cutter cylinder, said cylinder and shaft extending transversely across the main shaker D of the feeder, and being arranged quite close to the bottom thereof. To enable the band cutter to be used in connection with the main shaker D of the feeder, I provide the sides or walls d of said main shaker with the longitudinal slots, d', which are in horizontal alignment with each other and through which slots pass the shaft H to be fitted in the bearings, h, on the upper frame, G. A pulley, I, is fixed to one end of this shaft H of the band cutter; another pulley, I' is fixed to one end of the crank shaft, F, and a belt, I'' passes around the pulleys, i, on the shaft of the cylinder B, whereby the band cutter shaft H is rotated by the connections with the primary machine which operate the crank shaft F to rock the shakers, D, E, of the feeder.

Referring now more particularly to Figs. 4 to 7 inclusive, the band cutter consists of a cylinder, J, a series of spiders K, the knives L, and a means for clamping the sections of the cylinder together. The spiders K are each cast in a single piece of metal with a hub, k, and a series of radial arms. A series of these spiders are provided which are spaced at suitable intervals along the shaft, H, on which the hubs of the spiders are fitted, and which are clamped to the shaft by the set screws, k''. To the radial arms, k', of each spider is secured or riveted a series of the knives, L, each of which knives is curved longitudinally and provided with a sharpened cutting edge along the curved working surface of the blade. The cylinder J is made or composed of sections, the letters j, j', indicating the end sections, and the letter l indicating the intermediate sections which are held or confined between the end sections. Each section of the cylinder is provided at one end with a series of notches, m, which are spaced according to the distance between the knives L on the spiders, K, while the other edge of the section is left smooth and intact. The sections of the cylinder are preferably tubular or cylindrical in form and the knives L are fitted in the notches m of the sections while the notched edge of the section abuts squarely or firmly against the solid edges of the adjacent sections whereby the knives are braced and held firmly in place. The sections of the cylinder are fastened together at their meeting edges by means of the plates or connectors M which are arranged on the inside of the cylinder and span or bridge the adjacent edges of the section, said connectors being placed between the knives and having their ends fastened to the sections by bolts or rivets.

The sections j, j', l, of the cylinder are of equal diameter so as to be flush with each other, and against the end sections, j, j', of the cylinder bear the heads N, which are rigidly held in place by the nuts n fitted on threaded portions of the shaft H, and by means of these heads N the sections of the cylinder are held and clamped firmly together so that the knives will not work loose in the cylinder. It is evident that this "built up" cylinder can have its parts readily disconnected to permit the spiders and knives to be removed for the purpose of sharpening the knives or for replacing a broken or worn out knife, after which the parts can be easily assembled and rigidly clamped together.

Although I have shown and described the band cutting cylinder in the preferred embodiment of my invention as being made of hollow notched sections, yet I do not strictly confine myself to this detailed construction as it is evident that the cylinder can be made solid and the knives fastened thereto by bolts and nuts.

To keep the endless drive belt under proper tension in order to drive the crank shaft and band-cutter without slipping on the pulley thereof, I provide the tightening roller or pulley P which is pivoted to or journaled on one end of an adjusting lever Q. This lever Q is fulcrumed at a point intermediate of its length on a fulcrum pin or bolt q suitably fastened to the frame G, and the free end of the lever works in a segmental guide R. The guide is constructed to embrace the free end of the lever Q and to be fastened to the frame, and on the guide is formed a longitudinal segmental slot r, in which plays a threaded pin or bolt s, which is made fast to the lever Q and receives a clamping thumb nut s'. See Fig. 8. By tightening this thumb nut against the segmental guide, the lever Q is rigidly held in place and the pulley P can be pressed against the endless belt to take up any slack therein. All of the pulleys are flanged to prevent the belt from running off of them.

The sheaves of grain are prevented from passing over the band cutter by the inclined deflector board M which is arranged in advance of the cutter, as shown by Figs. 1 and 3 of the drawings. This inclined deflector board extends forward and upward from the cutter cylinder, and its upper edge is attached to the walls d of the primary shaker D of the feeder, the lower edge of the inclined deflector being about level with the shaft of the band cutter cylinder.

The inclined deflector causes the sheaf to pass beneath the cutter cylinder, along the bottom of the primary shaker, D, and as the sheaves are fed beneath the cutter cylinder, the projecting knives, L, pass into the sheaf and operate to sever or cut the bands which bind the sheaf together, thereby loosening the grain so that the primary and auxiliary shakers loosen and spread the grain before it reaches the thrashing cylinder and concave of the machine.

I am aware that slight changes in the form and proportion of parts and in the details of construction of the mechanism herein shown and described as an embodiment of my invention can be made without departing from the spirit or sacrificing the advantages of my invention, and I therefore reserve the right to make such modifications and alterations as fairly fall within the scope of my invention.

Having thus fully described my invention, what I claim as new, and desire to secure by Letters Patent, is—

1. The combination with a shaft H, a series of spiders K clamped to the shaft at suitable intervals thereon, and the knives L fastened to the spiders, of the cylinder J fitted on the shaft and inclosing the same and the spiders and composed of a series of sections, $j, j'$, which are arranged to abut against each other at their meeting flush edges, said abutting edges of the cylinder sections being provided with notches $m$ through which are passed the knives L, the connectors M spanning the abutting edges of the sections $j, j'$, on the inside of the cylinder, and heads N bearing against the ends of the cylinder and held on the shaft by the nuts $n$, substantially as described.

2. The combination with a thrashing machine, of the horizontal frames G, C, fastened to said machine and extending beyond the front end thereof, the frame G arranged above the frame C, a primary shaker D supported upon the frame C and having its vertical side walls $d$ provided with the coincident longitudinal slots $d'$, the band-cutter shaft H passing through the coincident slots in the walls $d$ of said shaker and journaled in bearings $h$ fastened to the upper frame G, whereby the shaker is sustained by one frame, C, and the band-cutter shaft H is sustained by the frame G in the same relation at all times to the shaker, and means for operating the shaker and band-cutter shaft, substantially as and for the purposes described.

In testimony whereof I affix my signature in presence of two witnesses.

ROBERT L. COOLEY.

Witnesses:
DAVID MATTESAN,
JOHN H. LENTT.